Nov. 30, 1943.    R. L. THOMPSON ET AL    2,335,574
SAFETY TURNING DEVICE FOR TIGHTENING BOLTS, SCREWS, OR THE LIKE
Filed Nov. 13, 1942
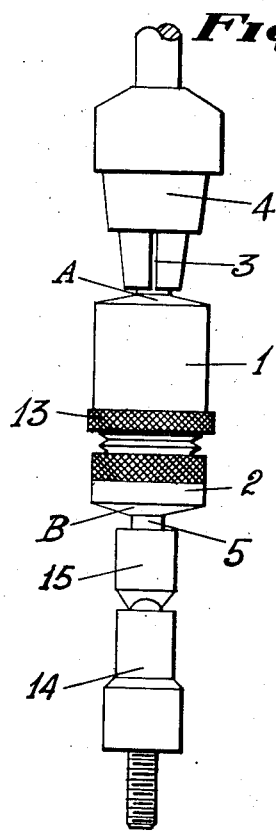
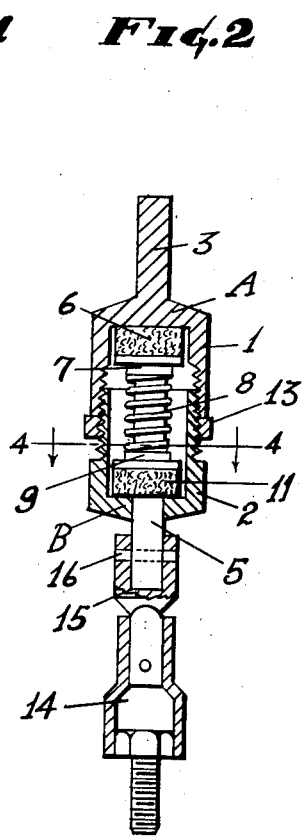
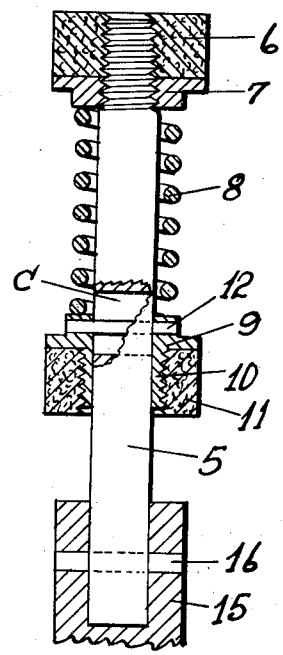
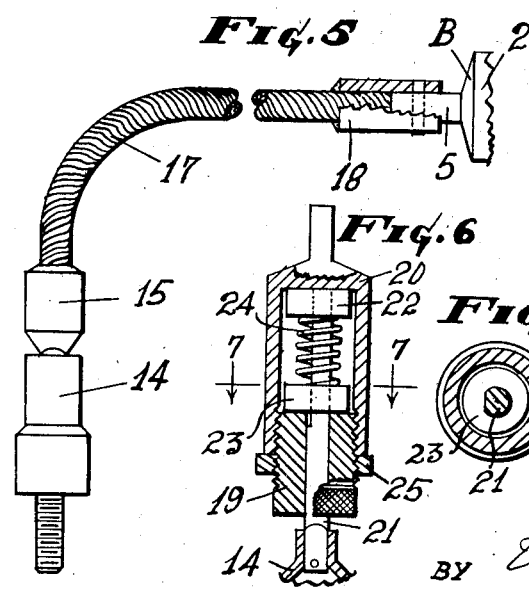
INVENTORS.
Roy L. Thompson
Nick F. Wasinger
BY U. Y. Charles
ATTORNEY.

Patented Nov. 30, 1943

2,335,574

UNITED STATES PATENT OFFICE 2,335,574

SAFETY TURNING DEVICE FOR TIGHTENING BOLTS, SCREWS, OR THE LIKE

Roy L. Thompson and Nick F. Wasinger, Wichita, Kans.; said Wasinger assignor to said Thompson Application November 13, 1942, Serial No. 465,508

1 Claim. (Cl. 64—30)

Our invention relates to a safety turning device for tightening bolts, screws, or the like, and has for its principal object a unit that is frictionally turned to avoid stripping the threads of a bolt, screw, or the like.

A further object of our invention is to provide a safety device having interchangeable means for driving elements such as screw drivers, sockets for bolts and drill bits, or the like.

A still further object of our invention is to provide an adjusting means for a friction drive to vary the tension of the device in its predetermined turning capacity.

A still further object of our invention is to construct a safety device having means to attach a cable drive for congested or cumbersome points of action, the device being power-driven as by an electric motor, portable or stationary, in either case, a flexible drive cable may be employed.

These and other objects will hereinafter be more fully explained, reference being had to the accompanying drawing forming a part of this specification, and in which like characters will apply to like parts in the different views.

Referring to the drawing:

Fig. 1 is a side elevation of the device showing its connection with a chuck as turning means for the device.

Fig. 2 is a longitudinal sectional view through the casing of the device, other parts being in elevation.

Fig. 3 is an enlarged sectional view longitudinally of the clutch mechanism and upper coupling, the casing and other parts removed for convenience of illustration.

Fig. 4 is an enlarged cross section taken on line 4—4 in Fig. 2.

Fig. 5 is an illustration showing one position of a driving cable and its end coupling means.

Fig. 6 is a modification of the device partly in section.

Fig. 7 is a cross section taken on line 7—7 in Fig. 6.

Our invention herein disclosed consists of upper and lower casing members 1 and 2, respectively, the upper member having a shank 3 axially extending from its upper extremity to receive the chuck 4 of a machine, or other turning means for the device. Said upper member 1 is axially bored from its lower end to a spaced distance from the shank at the other end, said end portion to function as head A, the bored portion being internally threaded while the lower member 2 is bored axially from its upper end downward to near the lower end thereof to provide a head B, that is axially apertured, said portion 2 being externally threaded to engage in the bore of member 1. The said members being thus formed and assembled will provide a hollow housing for a portion of a unit frictionally engaging therein, said portion consisting of an upper portion of a shaft 5 axially extending into the bore of said members 1 and 2 and outward through the apertured head B of the lower member as turning means for tools carried thereby, hereinafter more fully described.

The upper end of said shaft 5 is threaded for a spaced distance downward to threadedly engage a cylindrical fiber friction block 6 and a disc-like metal element 7 axially bored and threaded to function as a jam nut against further turning of said block, and furthermore to form a seat for the upper end of a spring 8 wound on the shaft, the lower end of the spring seating on a similar metal disc 9 which has a downward extension 10 functioning as a sleeve, being integral with the disc and externally threaded to engage in the threaded bore of a fiber block 11 similar to that at the upper end of the shaft, and for a similar purpose, the sleeve terminating a short distance inward from the bottom of the block to avoid metal engagement with the head of member 2, said fiber blocks being adapted to frictionally engage with their respective heads of the upper and lower members as tensioned by said spring 8, whereby a clutch is formed in the housing to control the shaft's rotation when said shaft is gauged to stall by a predetermined force of resistance to avoid stripping of threads. Last said disc 9 has a pin 12 diametrically crossing the same to avoid turning movement of the fiber block 11 on said shaft and the said pin to engage through a slot C diametrically crossing the shaft and being elongated longitudinally of the shaft so that the pin will move therein as the spring is tensioned variably for a predetermined pressure of the fiber blocks seated in their respective heads, the tension being accomplished by turning member 2 for a desired tension of the spring and said upper and lower members being locked against further rotation by a jam nut 13 threadedly engaging on the lower member and being brought to snug engagement with the lower end of the upper member, the periphery of the jam nut and a portion of the lower member being knurled as shown in Fig. 1 as a convenience to turn the same by a grip of the hands or otherwise.

It will now be seen that the shaft is turned by frictional engagement of the heads as the upper member is turned by motive power, or otherwise.

Being so arranged will avoid stripping of threads when the device is driving to snug engagement threaded bolts, wood or cap screws, the latter being illustrated in Figs. 1 and 2 wherein a socket 14 is employed to engage the head of the screw.

It will be understood that the shaft 5 extending through the head of member 2 has a coupling 15 secured thereto, said coupling being axially bored from its upper end to receive the end of the shaft insertible therein, and being secured by a pin 16 diametrically crossing the shaft and extending through the wall of the coupling, said coupling from its bore downward being preferably square to removably receive a variety of heads, one of which is the said socket 14 as turning means for nuts, cap screws, or the like. Said heads may be arranged for the manipulation of screw drivers, drill bits, or the like, and the heads may vary in size as the case may require.

Furthermore, heads may be arranged to engage a flexible cable 17, as illustrated in Fig. 5; in this instance the said coupling 15 may be removed and secured to the cable in any suitable manner while the other end of the cable may be connected to the turning device by a sleeve coupling 18 having the cable insertible in one end thereof and secured by welding while the other end of the coupling will receive the outer end of said shaft when its coupling 18 is removed. It is true however that coupling 18 may be constructed to engage with the square portion of coupling 15 to avoid removal of said coupling.

A further modification for the turning device is illustrated in Figs. 6 and 7, in which it will be seen that member 2 is eliminated and substituted by a plug 19 adapted to engage in the threaded bore of member 20 which is similar to member 1. The said plug is axially bored to receive a shaft 21 adapted to turn therein, said shaft having friction blocks 22 and 23 thereon and arranged to function similar to blocks 6 and 11. Wound on the shaft is a spiral spring 24 positioned between said blocks as tensioning means therefor to frictional engagement with their respective heads on which they seat, one head being the closed end of member 20 while the other head is the upper end of said threaded plug 19. To increase the frictional engagement of the blocks, the plug is screwed inward and secured by a lock nut 25 engaging on the end of said member 20. In this instance the lower block 23 is apertured to engage on the shaft slidably and rotatable therewith as that portion of the shaft extending therethrough has a flat side that extends longitudinal of the shaft, and the block 23 being apertured with the flat side accordingly as shown in Fig. 7, the upper block 22 being rigidly secured to the end of the shaft to turn therewith. Being so arranged the ends of the spring seat stationarily on their respective blocks and being undisturbed except when compressed or released.

A further modification is arranged by omitting the coupling 15, consequently the tool carrying socket couples direct with the lower end of said shaft as shown in Fig. 6, and such other modifications may be employed as lie within the scope of the appended claim.

Having fully described our invention what we claim as new, and desire to secure by Letters Patent is:

In a safety turning device for tightening bolts, screws, or the like, a hollow housing structure comprised of side and end walls, one end being axially apertured, a shaft having a portion of its length inserted through the aperture to engage in the housing, a stationary block on the end of the shaft portion positioned in the housing to engage with its respective end of said housing, a block carried by the shaft against rotation but slidable longitudinally on the shaft, and to engage with the other end of the housing, a spring wound on the shaft between the blocks, and means provided in the housing structure to compress the spring for frictional engagement of each block with its respective end of the housing to function as a clutch for a predetermined tension whereby when the hollow housing is turned the shaft will rotate therewith until said shaft is detained against rotation for the purpose specified.

ROY L. THOMPSON.
NICK F. WASINGER.